Oct. 29, 1968     C. F. COWAN, JR     3,408,144
FILM ADVANCING MEANS

Filed May 31, 1966     2 Sheets-Sheet 1

INVENTOR.
CHARLES F. COWAN
BY Fulwider, Patton, Rieber, Lee, and Utecht
ATTORNEYS

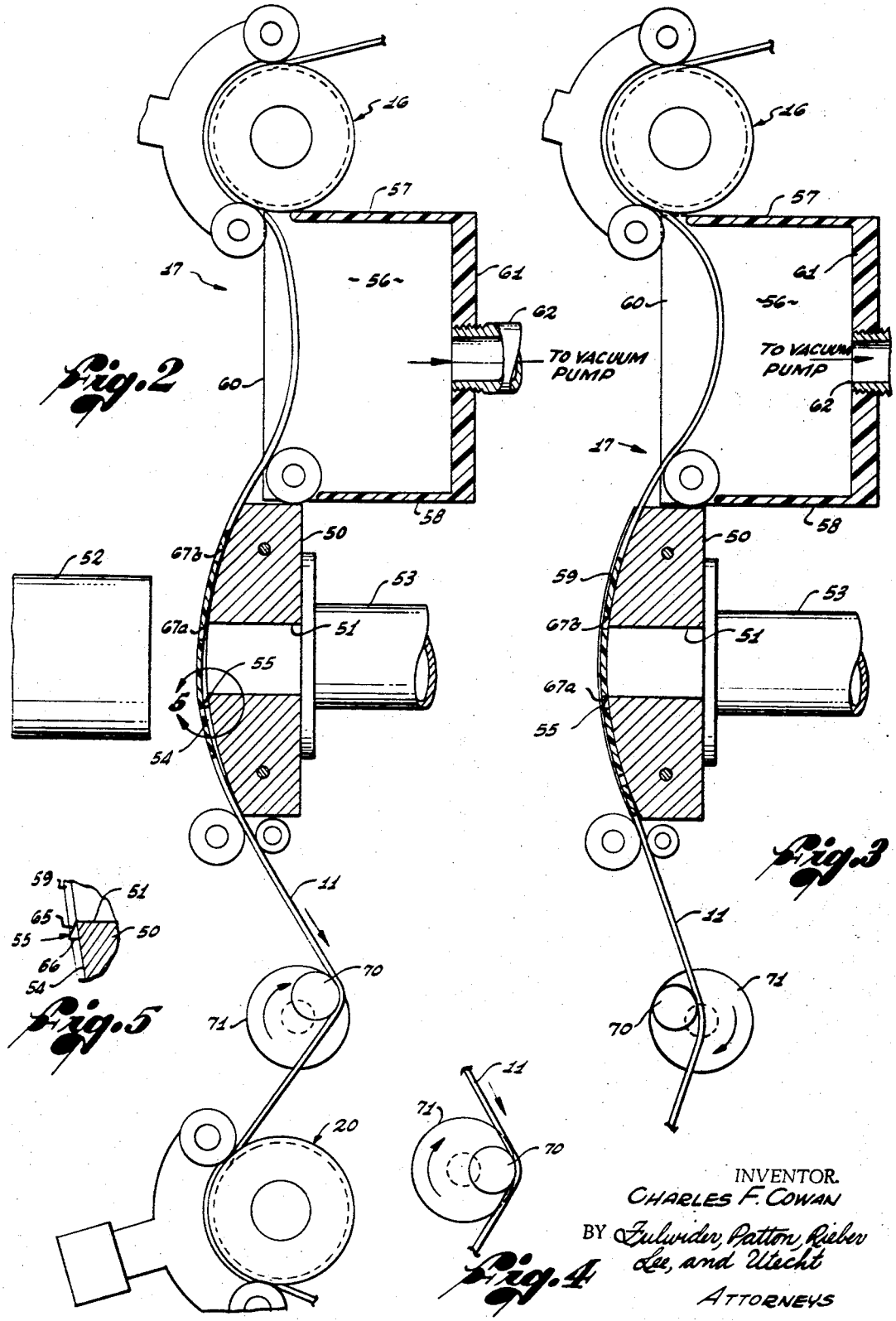

United States Patent Office 3,408,144
Patented Oct. 29, 1968

3,408,144
FILM ADVANCING MEANS
Charles F. Cowan, Jr., Rochester, N.Y., assignor, by mesne assignments, to Producers Service Co., a division of Greyhound Leasing and Financial Corporation, Hollywood, Calif., a corporation of California
Filed May 31, 1966, Ser. No. 553,754
15 Claims. (Cl. 355—48)

This invention relates generally to a motion picture film advancing means, and more particularly to a printer using that means in the exposing or printing of one film from another.

In the production of commercial motion pictures, the original film is exposed in a motion picture camera and then processed to form a "negative." This negative is then used to expose a second motion picture film which is in turn processed to form a "positive." Whether the pictures are in black and white or in color, this basic process is followed in substantially all cases except in those instances, principally in home or amateur movies, where a single film is exposed and the image on that film is then reversed, and no prints are made. In those cases where a reversal film is used to make duplicate prints, a printer is used. Thus, it is seen that a printer is a relatively basic tool of any film processing laboratory.

Generally, motion picture printers are divided into two classes, continuous printers and step printers. In the usual continuous printer, the exposed and processed negative film is pressed against an unexposed positive film and light is shone through the negative film to expose the positive film, which is then processed. While such a printer has the advantage of simplicity and can print film at very high speed, from a practical standpoint the negative and positive film must be the same size, and everything that appears on the negative will be printed onto the positive, and anything that does not appear on the negative will not be printed on the positive.

The second class of printers, known as step printers, is generally used where the size of the image is to be changed in going from a negative of one size to a positive of another size. Thus, if a 35 mm. motion picture film, originally prepared for theatre release, is to be reduced to 16 mm. size, the image appearing on the negative must be optically reduced to provide the proper size image on the positive film. Furthermore, since the image is thus reduced, the linear speed of the films will be different, and, because of the nature of the optical process, the films will travel in opposite directions.

It should be noted at this point that the words "negative" and "positive" are used in this specification and the appended claims to indicate two different films, and not to represent the nature of the image on the film. As used in this specification, the term "negative" refers to a previously exposed, developed, and fixed film, and the term "positive" refers to an unexposed film, or one that has just been exposed but not developed or fixed, the positive being exposed by light projected through the negative film. For the purposes of this invention, it does not matter whether the negative is a reversal of the original scene, as would customarily be expected in the case of normal photography of an original scene, or whether the film here designated as a "negative" is actually a reversal film, a print made from the first exposed film, or some other form. While a "negative" usually refers to a film in which the black and white of the original scene are reversed in the film image, and a "positive" has the black and white of the negative reversed to provide the black and white of the original scene in their correct locations and proportions, the word "negative" is used in this specification to indicate the printing film and the term "positive" is used to indicate the printed film.

In the operation of step printers, the negative film is first positioned with its image aligned with the appropriate aperture, and simultaneously the positive film is correspondingly aligned with its corresponding aperture. A shutter is then opened and light is passed through the negative film and the image thereon is focused on the positive film. Thereafter the shutter is closed and the negative film is advanced to the next frame, and the positive film is simultaneously similarly advanced. The advancement of the films is usually accomplished by film advancing pins that engage sprocket holes along the side of the film and advance the film to the desired position, and are then withdrawn from the film. To hold the film firmly in the desired position while it is stationary, other pins are generally inserted in the sprocket holes and these latter pins are known as register pins. The advancing pins and the corresponding register pins form the intermittent movement of the printer and convert the substantially uniform movement of the film from the supply reel and to the take-up reel to intermittent movement as the film moves across the film gate.

It will be appreciated that the design of the intermittent movement is rather complicated, and introduces many possibilities of mechanical failure or malfunction. Furthermore the constant motion of both sets of pins into and out of the sprocket holes result in the abrasion and wearing of the holes. Additionally, since the film must be accelerated from a rest or stopped condition, and then decelerated to the rest condition, it is at least difficult to secure a high speed operation without imposing excessive stresses on the film when the conventional pin or claw type of intermittent movement is used.

It will be recognized that the same general problems exist in the intermittent movement of cameras and projectors as in printers, but the requirement of printers are usually more rigorous, and the present intermittent will be described as it may be incorporated in a printer.

It is therefore a major object of the present invention to provide an improved film advancing means.

Another object of the invention is to provide a printer making use of such advancing means.

It is a further object of the invention to provide an improved printer in which both the negative and positive film are carefully handled so that there is a minimum of wear on both films.

Still another object of the invention is to provide a film advancing means that is capable of operating at speeds materially greater than those heretofore employed by comparable means.

It is still a further object of the invention to provide such a printer in which the foregoing objects are achieved in a manner that will provide a durable printer with minimum of complexities and with an inexpensive form of construction, having in mind the nature of the device.

These and other objects and advantages of the invention will become apparent from the following description of a preferred form thereof, and from the drawings illustrating that form in which:

FIG. 2 is a side elevational view of the intermittent movement on the left in FIG. 1, to an enlarged scale, showing the film as it appears when being advanced;

FIG. 3 is a view similar to FIG. 2 showing the film as it appears when it is stationary;

FIG. 4 is a side elevational view of the eccentric in its position of maximum displacement of the film; and FIG. 5 is an enlarged view of the area enclosed within the circle 5 in FIG. 2, showing the triangular shaped register pin.

Figure 1:
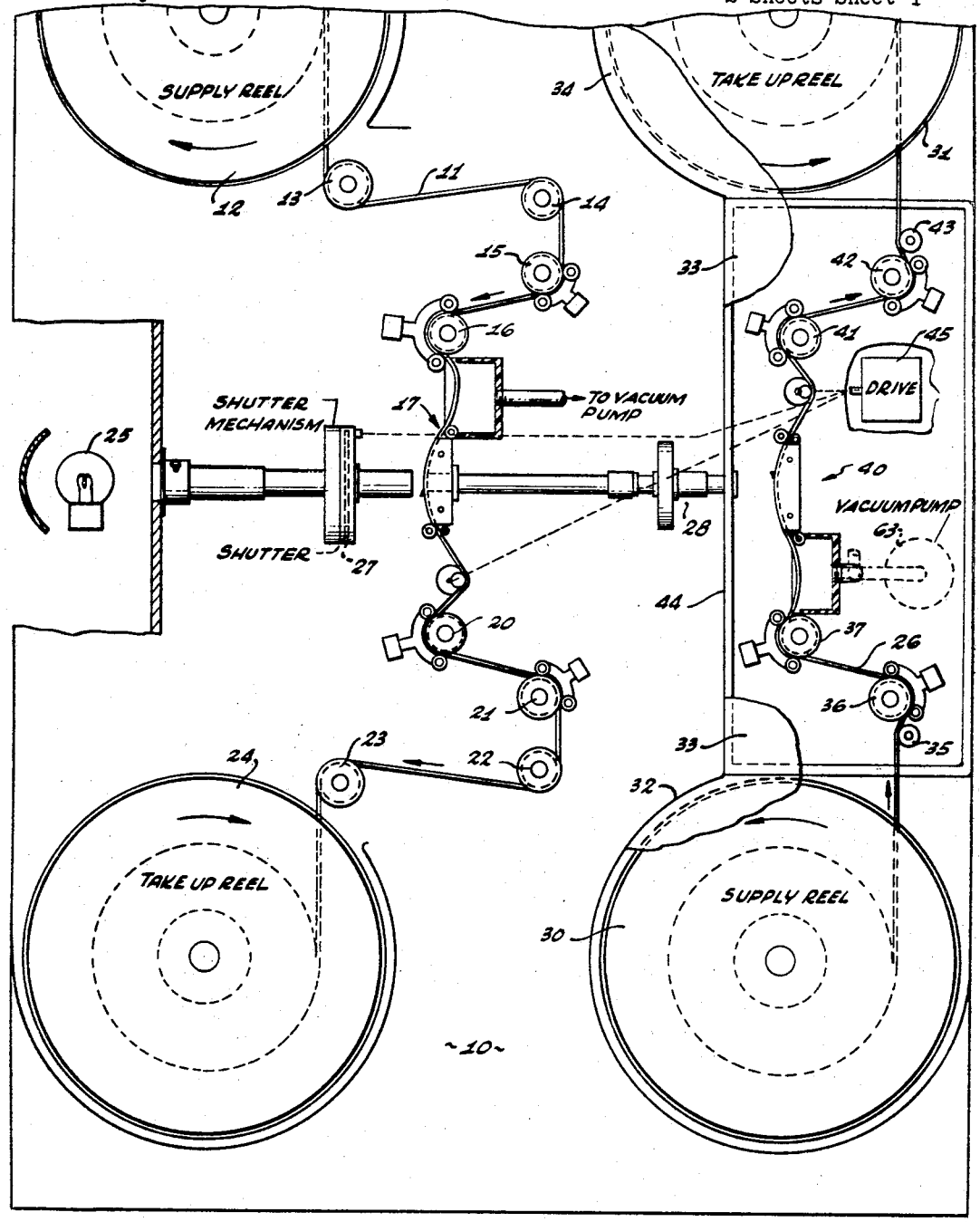
FIG. 1 is a side elevational view, partially broken away, showing the essential elements of the printer in operating relationship.

Referring now to the drawings and particularly to FIG. 1 thereof, the numeral 10 indicates generally a support, such as a vertical panel, on which are mounted the various elements. Thus, a negative film 11 is delivered from a supply reel 12, passes over a number of rollers and sprockets 13, 14, 15 and 16 on its way to the intermittent mechanism designated generally by the numeral 17. From the intermittent mechanism 17 the negative film 11 passes over sprockets and rollers 20, 21, 22 and 23 on its way to the take-up reel 24. A light source 25 is projected through the negative film 11 onto a positive film 26, while a shutter 27 interrupts a beam of light at appropriate intervals, and the image on the negative film 11 is properly focused on the positive film 26 by appropriate lens means 28.

It will be recalled that the negative film 11 is one which has been exposed and processed, and hence that film is not light sensitive, and may be handled in the light. The positive film 26, however, it will be recalled, is a film which has not previously been exposed to light and hence is light sensitive and must be handled in total darkness. For this reason, if the printer is intended for daylight, as opposed to darkroom operation, the positive film 26, in its passage from a supply reel 30 to a take-up reel 31, it is kept within a closed compartment that excludes all light except the image formed by the lens means 28. Normally, a hinged door or light-tight cover 32 will cover the supply reel 30, another hinged door 33 will cover the drive and intermittent mechanism hereinafter described, and another hinged door or light-tight cover 34 will enclose the take-up reel 31. In this way each of the doors or covers 32, 33, or 34 may be opened for access to the equipment contained therein without exposing the film in the remaining compartments.

As indicated, the positive film 26 passes over the rollers and sprockets 35, 36, and 37 in its passage from the supply reel 30 to an intermittent mechanism indicated generally by the numeral 40. From this intermittent mechanism, the positive film then continues over sprockets and rollers 41, 42, and 43 on its way to the take-up reel 31. The drive mechanism including the rollers and sprockets 35, 36 and 37, and the rollers and sprockets 41, 42 and 43, together with the intermittent mechanism 40 are contained within a light-tight housing indicated generally by the numeral 44, which is covered by the hinged cover 33.

From the description thus given, it will be recognized that the printer shown herein is what is known as an optical printer, in which the image on the negative 11 is optically enlarged or reduced, or occasionally merely projected without any change of size onto the positive film 26. Because of the lens means 28, the images on the negative 11 are inverted when they are projected on the positive 26, and consequently the negative and positive films move in opposite directions. Thus, in the form shown in FIG. 1, the negative film 11 moves generally downwardly, while the positive film 26 moves generally upwardly. Also, as previously indicated, the films move intermittently through the exposure area instead of continuously, and the printer is thus also known as an intermittent or step printer. It will be appreciated, of course, that the advancing of the negative 11 and the positive 26 must occur while the shutter 27 is closed, and the films must both be held stationary while the shutter is open. Such synchronization is preferably accomplished by means of a single driving means 45 such as a motor. The drive 45 is connected, as indicated by the dotted lines, by suitable means such as appropriate gears and shafts, to the intermittent mechanism 17, the shutter mechanism 27, and intermittent mechanism 40. Certain of the sprocket associated with each of the intermittent mechanisms are also driven by the drive 45, and thus sprockets 15, 16, 20 and 21, associated with the intermittent mechanism 17, are positively driven, as are sprockets 36, 37, 41, and 42, associated with the intermittent mechanism 40.

The operation of the intermittent mechanism is illustrated in FIGS. 2 and 3; and these figures illustrate the intermittent mechanism 17 to a larger scale than that shown in FIG. 1. It will be noted that power-driven sprocket 16 is at the upper end of the intermittent mechanism, and power-driven sprocket 20 is at the lower end. Not shown in these figures are power-driven sprockets 15 and 21 that isolate the supply and take-up reels 12 and 24 from the action of the intermittent mechanism 17. Negative film 11 passes through the intermittent mechanism 17 from the upper power-driven sprocket 16 to the lower power-driven sprocket 20.

Approximately midway between the upper sprocket 16 and the lower sprocket 20 is an aperture block or film gate 50 rigidly mounted on the panel 10 and having an aperture 51 extending therethrough that is aligned wtih a light tube 52 from the shutter mechanism 27, and also aligned with another light tube 53 extending to the lens means 28. The aperture 51 is substantially the size and shape of the image or frame appearing on negative film 11, and the light tubes 52 and 53 are provided to confine the light from the source 27 to the desired path and also to prevent extraneous light from entering the lens means 28, thus possibly fogging or otherwise undesirably exposing the positive film 26. Aperture block 50 has a curved and polished surface 54 across which the film 11 passes, and, if desired, the central portion of the surface 54 may be recessed so that the film 11 is supported at its edges and there is no likelihood of scratching the image-bearing surface of the film. The surface 54 is convexly curved as indicated to insure that the negative film 11 is held in contact with the rear surface of aperture block 50 at all times, thus maintaining the film in the proper focal plane. Lateral restraint of the film 11 is provided by suitable guide members 59 against which the sides of the film bear.

A register pin 55 projects from the surface 54 at one or both sides of the film and is located to engage an appropriate sprocket hole of negative film 11 when one of the images or frames on that film is properly aligned with the image aperture 51. In the case of 8 mm. and 16 mm. films, this presents no particular problem, since there is the equivalent of one sprocket hole per frame. In the case of 35 mm. film, however, there are generally a plurality of sprocket holes per frame, and care must be taken to make sure that the film 11 is properly located with respect to the aperture 51.

As is customary in intermittent mechanisms, for a portion of its travel the film is fed at a constant linear rate, thereafter a slack portion or a loop is formed, the film is then advanced intermittently, and the film is thereafter formed into another loop and then advanced at a uniform rate. The first uniform linear advancing means, the intermittent advancing means, and the second uniform linear advancing means are found in the present device, but the usual loop or slack portions are modified.

As seen in FIG. 2, the negative film 11 is advanced by the positively driven sprocket 16, this sprocket turning at a constant rate of speed and advancing the film 11 linearly at a uniform rate. From the sprocket 16, the film 11 passes across the open end of a vacuum chamber 56 having upper and lower walls 57 and 58 that are connected by front and rear walls 60. The end of the vacuum chamber 56 that is opposite the open end across which the film 11 passes is closed by a wall 61 having a connector 62 that is connected to a vacuum pump 63, shown in FIG. 1. The side walls 60 are parallel to each other and are spaced apart a distance only slightly greater than the width of the negative film 11 so that when a vacuum is produced in chamber 56, the film 11 is drawn into the chamber as indicated generally in FIG. 3. The vacuum chamber 56 thus acts as a resilient loop-forming means for the negative film 11.

From the vacuum chamber 56, the negative film 11 moves across the surface 54 of the aperture block 50, but at this point, its motion is intermittent, as determined by the film advancing means hereinafter described.

Since the negative film 11 is always advanced in one direction, downward in FIG. 2, and since the vacuum chamber 56 provides a resilient means urging the film below it generally upward, the film may be advanced a precise amount and properly aligned with the aperture 51 by pulling the film downwardly an amount equal to or greater than the ultimate desired movement, and then allowing the vacuum chamber 56 to take up any excessive downward movement of the film. With this arrangement, it is clear that there must be a stop of some sort that will prevent undesired upward movement of the negative film 11 and thus precisely locate the film with respect to the aperture 51. This locating or register means, in the present invention, consists of the triangular tooth or pin 55 projecting from the surface 54 of the aperture block 50. For convenience, the direction in which the film advances may be designated as "downstream," and the reverse direction as "upstream."

As best seen in FIG. 5, the pin 55 has an upper surface 65 that is angularly positioned with respect to the surface 54, the upper end of the surface 65 meeting the surface 54, and the surface 65 then extending downwardly and outwardly from the surface 54, as illustrated. At its lower end, the pin 55 has an indexing surface 66 that is substantially perpendicular to the surface 54 and extends from that surface to the angularly positioned surface 65. The dimensions of the pin 55 are such that it will fit readily within a perforation in the film 11, and in so doing will engage the lower edge of the perforation in a firm and secure manner, it being understood that the perforations of the negative film 11 are precisely located with respect to the images on that film, and are, in fact, the positioning means by which the images are originally located. Preferably, the pin 55 is so located as to engage the same perforation as was engaged by the corresponding locating pin in the camera, thus insuring the best possible registration.

As indicated in FIG. 2, as the negative film 11 is advanced, the upper edge of the perforation that has been engaged by the pin 55 is moved across the angularly positioned surface 65 so that the film is, in effect, cammed or lifted over the pin 55. The film 11 is thus freely moved downstream, across the pin 55, and some of the film that has been drawn into the vacuum chamber 56 is removed from that chamber.

When the proper length of film has been advanced, the appropriate sprocket hole 67a is substantially aligned with the pin 55, or is advanced slightly beyond the pin. At this point no further downstream movement of the negative film 11 occurs, and the vacuum chamber 56 urges the film upstream, in a direction to permit more of the film to enter the vacuum chamber. This causes the lower edge of the sprocket hole 67a to bear firmly against the indexing surface 66 of the pin 55, as indicated in FIG. 3. That portion of the negative film 11 extending across the surface 54 of the aperture block 50 thus remains in the position shown in FIG. 3 until it is again advanced one frame, as just described. In the meantime, the sprocket 16 continues to feed film at a uniform linear rate toward the vacuum chamber 56, which draws this film into the chamber to provide the necessary slack for the next advancement of the film.

The advancement of the film is effected by a roller 70 that is eccentrically mounted on a rotating shaft 71. The shaft 71 is located in such a position that the film 11 is displaced by the rollers in the passage of the film from the aperture block 50 to the driven sprocket 20. As indicated in FIG. 2, the film 11 passes from the aperture block 50, preferably between a pair of rollers 72 that act to guide the film, over the eccentrically mounted roller 70, and then to the power driven sprocket 20. The portion of the film 11 between the aperture block 50 and the eccentrically mounted roller 70 makes an angle with that portion of the film between the roller and the powered sprocket 20. When the eccentric roller 70 is in some predetermined position, determined by the geometry of the film path, such as indicated in FIG. 4, the film 11 is displaced the maximum amount. As the roller 70 then continues its rotation about the center of the shaft 71, the displacement of the film 11 is reduced and the excess film may be advanced by the continuously rotating sprocket 20. Finally, at another predetermined point, again determined by the geometry of the film path, and such as indicated in FIG. 3, the film is displaced the minimum amount.

From the time of maximum displacement, indicated in FIG. 4 to the time of minimum displacement, indicated in FIG. 3, that portion of the negative film 11 extending between the aperture block 50 and the eccentric roller 70 is not linearly advanced, but instead remains substantially stationary. Immediately after the maximum advance of the negative film 11, any over-travel of the film is eliminated by its slacking above the eccentric roller 70 and the rearward movement of the film into the vacuum chamber 56. The rearward or upstream movement of the film into the chamber 56 is stopped by the engagement of the sprocket hole 67a with the indexing surface 66 of the pin 55. Thereafter, some of the slack that develops in the portion of the film between the aperture block 50 and the driven sprocket 20 is taken up by the sprocket as it rotates at its constant rate.

After the eccentric roller 70 has reached its position of minimum displacement, indicated in FIG. 3, with a minimum length of film between the aperture block 50 and the sprocket 20, further rotation of the shaft 71 moves the roller toward the position of maximum displacement, illustrated in FIG. 4, with the maximum length of film between the aperture block and the sprocket. Since the sprocket 20 is being continuously driven in a direction to advance the film 11, the additional length of film must be drawn across the aperture block 50. Consequently, the rotation of the shaft 71 and the resultant displacement of the eccentric roller 70 cause the film 11 to be pulled across the aperture block 50, removing some of the film that has been drawn into the vacuum chamber 56. At the same time, the sprocket 20 is being continuously rotated, and consequently further positive advancement of the film 11 occurs during this portion of the movement of the eccentric roller 70. After the roller 70 has reached its position of maximum displacement, it then returns to the position of minimum displacement, as heretofore described, and during this time the film 11 is held firmly in position and in registration with the aperture 51 by the register pin 55.

It will thus be apparent that the present intermittent mechanism acts to convert uniform linear movement of the film 11 to intermittent motion of the film and then back to uniform linear motion. The sprocket 16 advances the film 11 at a uniform rate, and during the time that the film is held stationary in front of the aperture 51, the film being advanced by the sprocket 16 is drawn into the vacuum chamber 56. It is during this time that the eccentric roller 70 is moving from its maximum displaced position to its minimum displaced position, and the film is held in the predetermined position by means of the indexing surface 66 of the register pin 55 that bears against the lower edge of the appropriate sprocket hole in the edge of the film. Also during this time when the film 11 is stationary in front of the aperture 51, the film that is made available by the return of the roller 70 from its position of maximum displacement toward its position of minimum displacement, is taken by the uniformly rotating sprocket 20 that then delivers the film 11 at a uniform rate to the next sprocket 21. When the eccentrically mounted roller 70 then starts to move from its position of minimum displacement to its position of maximum displacement, the film that was previously drawn into the vacuum chamber 56 is retrieved therefrom and pulled across the aperture block 50 even as additional film is being fed into the vacuum chamber by the sprocket 16, and as the film is further being drawn across the roller 70 by the sprocket 20.

As the film 11 is advanced, the portions aligned with the sprocket holes ride over the register pin 55, as indicated in FIG. 2, until such time as the lower edge of a sprocket hole passes over the point or peak of the register pin 55. At that time the film 11 drops onto the surface 54 of the aperture block 50 until it is further advanced and the upper edge of the sprocket hole moves across the angularly positioned surface 65.

The film advancing means for the positive film 26 is essentially the same as that illustrated and described in connection with the film 11. However, since the film 26 moves in the opposite direction from the film 11, the positive film 26 will move upwardly, from the supply reel 30, to the takeup reel 31. Also, it is very likely that the positive film 26 is a different size from the negative film 11, and consequently the film will be advanced at a different linear speed. However, this is accomplished by the circumferential speed of the driven sprockets 36, 37, 41 and 42 being properly adjusted, and the geometry and amount of eccentricity of the corresponding roller 70 being properly coordinated.

It will be appreciated that one of the important advantages of the present form of film advancing mechanism is that there are no pins or claws that are constantly being inserted into and removed from the sprocket holes of the film. As a result, the film is maintained in good condition for a much longer period of time, and tearing of the sprocket holes is substantially eliminated. Furthermore, with the elimination of the film advancing pins and the moveable register pins, the mechanism is greatly simplified and the printer operates more quietly and with less vibration.

In addition, because of the smoother action of the present form of film advancing means, the film may be run at a much higher speed, and by way of example, where standard printers have heretofore run at a speed of approximately 40 ft. per minute, for 35 mm. film, with this design the film can be run at speeds as high as 200 ft. per minute, likewise with 35 mm. film. Other film sizes can, of course, be printed at corresponding speeds.

From the foregoing, it will become apparent that there has been disclosed a film advancing mechanism and a printer making use of that mechanism fully capable of achieving the objects and securing the advantages heretofore set forth, it will be appreciated that modifications can be made therein, and consequently the patent is not to be restricted to the particular form or arrangement of parts herein described and shown, except as limited by the following claims.

I claim:

1. Film advancing means for intermittently driving a perforated film, which includes:
    first means for advancing said film from a source of supply;
    second means for advancing said film to a receiving means; and
    an intermittent advancing means between said first and second means and comprising
        means for resiliently urging the formation of a loop of said film after it leaves said first means;
        gate means having a surface across which said film is adapted to be moved, said gate means having an aperture therein;
        a register pin adjacent said aperture, positioned to engage a perforation of said film and limit movement of said film toward said first advancing means, said pin being located as to index a frame on said film with respect to said aperture; and
        movable roller means adapted to engage said film and cyclically pull said film past said gate means toward said second means.

2. Film advancing means as defined in claim 1 in which said movable roller means cyclically lengthens the path followed by said film in passing from said gate means to said second means.

3. Film advancing means as defined in claim 1 in which said movable roller is eccentrically mounted for rotation about an axis, and the path of said film from said gate to said movable roller is at an angle to the path of said film from said movable roller to said second means.

4. Film advancing means as defined in claim 1 in which said loop forming means includes a vacuum chamber into which said film is resiliently urged.

5. Film advancing means as defined in claim 1 in which said loop forming means includes a chamber open along one side, with said film passing across said side and movable into said chamber, and means to form a reduced pressure within said chamber, whereby said film may be resiliently drawn into said chamber.

6. Film advancing means as defined in claim 1 in which the upstream surface of said register pin is angularly positioned to permit downstream movement of said film across said pin, and the downstream surface of said pin is generally perpendicular to the plane of said film to limit the upstream movement of said film.

7. Film advancing means as defined in claim 1 in which said loop forming means includes a vacuum chamber into which said film is resiliently urged, and said movable roller means alternately lengthens and shortens the path followed by said film in passing from said gate means to said second means.

8. Film advancing means as defined in claim 7 in which said register pin has a generally triangular shape with an angularly positioned upstream surface, and a downstream indexing surface substantially perpendicular to the plane of said film, whereby advancing of the film causes it to ride over said angular surface, and said indexing surface engages an edge of a perforation to prevent upstream movement of said film.

9. Film advancing means as defined in claim 1 in which said loop forming means includes a chamber open along one side, with said film passing across said side and movable into said chamber, and means to form a reduced pressure within said chamber, whereby said film may be resiliently drawn into said chamber, and in which said movable roller is eccentrically mounted for rotation about an axis, and the path of said film from said gate to said movable roller is at an angle to the path of said film from said movable roller to said second means.

10. Film advancing means as defined in claim 9 in which said register pin has a generally triangular shape with an angularly positioned upstream surface across which said film may be moved downstream, and has a downstream indexing surface substantially perpendicular to the plane of said film to engage the downstream edge of a perforation to limit upstream motion of said film.

11. A film printer which includes:
    a first film advancing means for advancing a negative film;
    a second film advancing means for advancing a positive film, said first and second film advancing means being driven in synchronism and each comprising
        first film drive means for advancing film from a supply reel;
        second film drive means for advancing film to a take-up reel;
        and intermittent film advancing means between said first and second drive means and including
            means for resiliently urging the formation of a loop of said film after it leaves said first film drive means;
            gate means having a surface across which said film is adapted to be moved, said gate means having an aperture therein;

a register pin adjacent said aperture, positioned to engage a perforation of said film and limit upstream movement of said film, said pin being so located as to index a frame on said film with respect to said aperture; and movable roller means adapted to engage said film and cyclically pull it downstream, past said gate means;

an optical system between said first and second film advancing means adapted to project an image of a frame on said negative film onto said positive film;

a shutter synchronized with said first and second film advancing means to close and thereby interrupt said projection of said image on said positive film while both said positive and negative films are moving, and to open and thereby allow said projection while both said films are held in register and against movement.

12. A film printer as defined in claim 11 in which said means for resiliently urging the formation of a loop includes a vacuum chamber having one side open across which said film is moved, and a common vacuum pump, said vacuum chambers of said first and second film advancing means both being connected to said common vacuum pump.

13. A film printer as defined in claim 11 in which said register pin has an angularly positioned upstream surface over which said perforations are adapted to ride, and has a downstream indexing surface adapted to engage an edge of a perforation to prevent upstream movement of said film.

14. A film printer as defined in claim 11 in which there is a common drive means provided for driving said first and second film advancing means and said shutter, said first and second film advancing means being synchronized with each other and operated to advance their respective films at linear speeds that correspond to the same frame speeds.

15. A film printer as defined in claim 14 in which said means for resiliently urging the formation of a loop includes a vacuum chamber having an open side across which said film is moved, and a common vacuum pump connected to said vacuum chambers of both said first and second film advancing means.

References Cited

UNITED STATES PATENTS

| | | | |
|---|---|---|---|
| 2,601,347 | 6/1952 | Waller | 352—184 |
| 2,672,074 | 3/1954 | Gunby | 88—24 |
| 2,747,457 | 5/1956 | Wengel | 352—184 |
| 2,892,379 | 6/1959 | Cooper | 88—24 X |
| 3,236,580 | 2/1966 | Zahn | 352—185 |

NORTON ANSHER, *Primary Examiner.*

RICHARD A. WINTERCORN, *Assistant Examiner.*